US006212081B1

(12) United States Patent
Sakai

(10) Patent No.: US 6,212,081 B1
(45) Date of Patent: Apr. 3, 2001

(54) UNINTERRUPTIBLE DUPLEXED POWER SUPPLY SYSTEM

(75) Inventor: Setsuo Sakai, Amagasaki (JP)

(73) Assignee: Nihon Protector Co., Ltd., Hyogo (JP)

( * ) Notice: Subject to any disclaimer, the term of this patent is extended or adjusted under 35 U.S.C. 154(b) by 0 days.

(21) Appl. No.: 09/538,229

(22) Filed: Mar. 30, 2000

(30) Foreign Application Priority Data

May 14, 1999 (JP) .................................................. 11-133500

(51) Int. Cl.[7] .................................................. H02M 3/335
(52) U.S. Cl. .................................................. 363/71; 363/55
(58) Field of Search .................................................. 363/65, 71, 50, 363/55, 56; 307/64, 66, 71, 85, 86

(56) References Cited

U.S. PATENT DOCUMENTS 5,008,794 * 4/1991 Leman .................................................. 363/56 X
5,602,726 * 2/1997 Sakai .................................................. 363/55

* cited by examiner

*Primary Examiner*—Jessica Han
(74) *Attorney, Agent, or Firm*—Armstrong, Westerman, Hattori, McLeland & Naughton, LLP

(57) ABSTRACT

The present invention provides an uninterruptible duplexed power supply system, which is capable of achieving high efficiency and compact size, and moreover, is capable of solving for a power circuit failure in an energized state. This uninterruptible duplexed power supply system connects via a high-frequency transformer 7 a power circuit A, which rectifies AC from a commercial AC power supply 1, and which includes a switching device 6 for outputting; a secondary DC outputting circuit B, which supplies electric power to a load; and a DC power circuit C, including a switching device 20 for synchronizing with switching device 6 of power circuit A, and for operating this DC power circuit C, and is constituted so that the power circuit A is unitized, and this power circuit unit is detachable in a connected state, wherein same is connected electrically to the high-frequency transformer 7, and in a connection release state, and is constituted so as to provide device for buffering or preventing overcurrent reverse current resulting from induced voltage from the DC power circuit C via the high-frequency transformer 7 to the power circuit A, and so that the power circuit unit is detachable in an energized state.

4 Claims, 4 Drawing Sheets

(A)

(B)

(C)

UNINTERRUPTIBLE DUPLEXED POWER SUPPLY SYSTEM

BACKGROUND OF THE INVENTION

1. Field of the Invention

The present invention relates to an uninterruptible duplexed power supply system for driving a load in accordance with the rectified output from a commercial alternating current (AC) power supply during normal operation, and for driving a load in accordance with output from a secondary battery or some other direct current (DC) power supply when a power outage or some other abnormality occurs, and more particularly to an uninterruptible duplexed power supply system, which is utilized to operate important equipment such as precision machinery and automated equipment for crime prevention, disaster prevention, telecommunications, information (servers, FA personal computers), and medical treatment. Here, power outage refers to an interruption in a supply of electric power (electric current), for example, when the power supply from an electric power company is interrupted, or when a power supply is interrupted by a circuit breaker opening, a plug coming out of a socket, or a wire breaking.

2. Description of the Related Art

Computer servers, in particular, are required to operate continuously 24-hours-a-day without stopping for five years. In general, the power supply system shown in FIG. 4, for example, is the specific configuration used therefor. This system is designed to enable power to be supplied to a load continuously, and constitutes an uninterruptible power supply (UPS) 50 connected to a commercial AC power supply; 2 switching power supplies 51, 52, which connect in parallel for securing (duplexing) the switching power supply used as the power supply for the server; and 2 sets of diodes 53, 54 for preventing sneak current, by which a current outputted from one switching power supply of these switching power supplies 51, 52 flows into the other switching power supply. Therefore, this system is constituted so that when one switching power supply 51 fails as a result of a lightning surge, or any of various impulse surges and the like being introduced into the AC line, the other switching power supply 52 is capable of supplying power to a load in its place.

According to the above-described constitution, because the switching power supplies 51, 52 are connected in series to the uninterruptible power supply 50, the 75–80% efficiency of the switching power supplies 51, 52 is crossed with the 75–80% efficiency of the uninterruptible power supply 50 to produce an approximately 55–64% overall efficiency, and is inexpedient in that energy loss becomes a problem.

Further, because the uninterruptible power supply 50 is separate from the 2 switching power supplies 51, 52, it is inexpedient in that not only is a large space required, but the price is also high.

Further, 2 diodes 53, 54 are required to prevent sneak current in the 2 switching power supplies 51, 52, respectively, requiring a total of 4 or more diodes in all, thus causing the system to become even larger.

The inventors previously proposed an apparatus for solving the above-mentioned inexpediencies. As disclosed in Japanese so Patent No. 2702048, this constitutes an uninterruptible switching regulator (uninterruptible duplexed power supply system), which integrates an AC power circuit, a DC power circuit, switching circuits relative thereto, and a secondary DC outputting circuit, which supplies electric power to a load, by connecting to the primary winding of a high-frequency transformer a power circuit comprising a rectifying circuit, which rectifies the AC from a commercial AC power supply, and a switching device provided on the output side of this rectifying circuit, and connecting to the secondary winding of the above-mentioned high-frequency transformer a secondary DC outputting circuit, which supplies electric power to a load, and connecting to the tertiary winding of the above-mentioned high-frequency transformer a DC power circuit, comprising a switching device and the like for operating this DC power circuit in accordance with the operating status of the above-mentioned power circuit.

However, when the above-mentioned power circuit malfunctions as a result of a lightning surge or any of various impulse surges being introduced into the AC input line, although a load can be driven in case of emergency by the DC power circuit, the damaged components of the power circuit must be replaced. During this replacement, the power supply must be shut OFF after using a predetermined operation to temporarily shut down the computer. Not only is this shutdown operation troublesome, but the computer cannot be operated during this replacement work. This system is thus inexpedient in that it does not fully satisfy the conditions of a stable, reliable power supply.

Further, structurally it was difficult to replace the damaged components of the above-mentioned power circuit while the DC power circuit was driving a load.

Consequently, up until now, it has been necessary to use a method, wherein the above-described uninterruptible switching regulator (uninterruptible duplexed power supply system) is connected in parallel just like the switching power supplies 51 and 52 of FIG. 4. Moreover, because a parallel connection is used, the diodes 53, 54 of FIG. 4 are necessary to prevent sneak current, with the result that, to the extent that the uninterruptible power supply, (UPS) 50 became unnecessary, the system was unsatisfactory from the standpoint of achieving compactness and conserving space, and was uneconomical.

SUMMARY OF THE INVENTION

Accordingly, with the foregoing in view, the present invention provides an uninterruptible duplexed power supply system that makes possible high efficiency and compact size, and moreover, is capable of solving for a power circuit failure in an energized state.

The present invention is an uninterruptible duplexed power supply system, which, in order to solve for the above-mentioned problems, is constituted by connecting to the primary winding of a high-frequency transformer a power circuit comprising a rectifying circuit, which rectifies the AC from a commercial AC power supply, and a switching device provided on the output side of this rectifying circuit; and connecting to the secondary winding of the above-mentioned high-frequency transformer a secondary DC outputting circuit, which supplies electric power to a load; and connecting to a tertiary winding of the above-mentioned high-frequency transformer a DC power circuit, comprising a switching device for either synchronizing with the above-mentioned power circuit switching device, or for operating the DC power circuit in accordance with the operating status of this power circuit, this system being characterized in that it is constituted so that at least the power circuit of the above-mentioned power circuit and DC power circuit is unitized, and this power circuit unit is detachable in a connected state, in which same is electrically connected to the primary winding of the above-mentioned high-frequency transformer, and in a connection release state, wherein this connected state is released; provides means for either buffering or preventing an overcurrent reverse current resulting from induced voltage from the above-mentioned DC power circuit via the above-mentioned high-frequency transformer to the above-mentioned power circuit; and is constituted so that the above-mentioned power circuit unit is detachable in an energized state.

The inventors observed that damage principally to a power supply is more often than not caused by a lightning surge or external impulse surge introduced into a commercial power supply, and that the portion which is damaged can be limited for the most part to power circuit A shown in FIG. 1.

This is supported by the fact that, as shown in FIG. 1, in addition to making the primary insulation strength of a primary power circuit A, to which a commercial power supply is applied, a completely insulated DC power circuit C, and a similarly insulated secondary DC outputting circuit B. which is a characteristic feature of the uninterruptible duplexed power supply system of the present invention, capable of withstanding between, for example, AC3800V and AC4000V for around 1 minute, it is possible to limit the above-mentioned damaged portion to power circuit A for the most part by heightening reliability by providing a greater margin in the load derating ratio of electronic components, which are utilized in the DC power circuit C and the secondary DC outputting circuit B, and increasing service life to 10 years or longer. Therefore, the above-mentioned problems can be solved by simply using a structure, which enables the above-mentioned power circuit A in particular to be readily removed from externally, and using a constitution/structure, which makes hot swapping (energized replacement) possible.

By using the above-mentioned constitution, even if the power circuit fails as a result of a lightning surge or any of various impulse surges, a load can be continuously driven without stopping by instantly supplying power from a DC power circuit. When the voltage of the power circuit drops below a prescribed voltage, or becomes zero, a switching device for the above-mentioned DC power circuit switches from either idle or an OFF (shutdown) state to an active state. The above-mentioned idle refers to a state, wherein a switching device repeatedly switches ON-OFF in synchronization with the switching device of the power circuit, but current does not flow.

Then, after removing the damaged power circuit unit, power circuit replacement work can be performed quickly and easily in accordance with mounting a new (normal) power circuit unit, establishing a connected state, wherein the power circuit unit is connected electrically to the primary winding of the high-frequency transformer, and re-energizing the commercial AC power supply, by setting the above-mentioned switching device to either idle or the OFF (shutdown) state, stopping the power supply to the load from the DC power circuit, while simultaneously setting the switching device of the connected power circuit unit to an active state, and switching the power supply to the load from that of the DC circuit to that of the power circuit unit. It is possible to buffer or prevent an overcurrent reverse current resulting from induced voltage in the power circuit when the above-mentioned power circuit unit is electrically connected to the primary winding of the high-frequency transformer. Therefore, in a state, wherein the load is being driven by the DC circuit, an arc is not generated in the connector between the power circuit unit and the primary winding of the high-frequency transformer. Consequently this connector is not welded and the element is not broken. Furthermore, as the power supplied to a load from the DC power circuit flows instantly as a rush current into the smoothing capacitor of the power circuit unit, a drop occurs in the output (load) voltage of the secondary DC outputting circuit, making it possible to reliably avoid any kind of impediment using, for example, the reverse current-preventing diode 11 and limiting resistor 12 of FIG. 1, thus enabling a power circuit unit to be readily replaced in an energized state.

The present invention is characterized in that during normal operation of the above-mentioned commercial AC power supply, the switching device of the above-mentioned power circuit is in an active state, this power circuit operates, and the switching device of the above-mentioned DC power circuit is either idle, or in the OFF state, and this DC power circuit is maintained in the idle state. When an abnormality occurs and the above-mentioned commercial AC power supply drops below a prescribed value, the switching device of the above-mentioned power circuit becomes either idle or enters the OFF state, and the switching device of the above-mentioned DC power circuit transitions to the active state, this DC power circuit operates, and an uninterruptible power supply is furnished to the above-mentioned load.

As described above, by constituting the present invention so that when the commercial AC power supply is operating normally, only the power circuit operates and drives the load, and when an abnormality occurs and the commercial AC power supply drops below a prescribed value, only the DC power circuit operates and supplies power to a load, it not only enables the simplification of the control of the power circuit and DC power circuit, but also makes it possible to enhance the durability of the switching devices, and to lower running costs.

The present invention is constituted so that the above-mentioned DC power circuit is unitized, and this DC power circuit unit is detachable in a connected state, in which same is electrically connected to the tertiary winding of the above-mentioned high-frequency transformer, and in a connection release state, wherein this connected state is released, provides means for either buffering or preventing an overcurrent reverse current resulting from induced voltage from the above-mentioned power circuit via the above-mentioned high-frequency transformer to the above-mentioned DC power circuit, and is constituted so that the above-mentioned DC power circuit unit is detachable in an energized state.

As described above, by unitizing the DC power circuit, a DC power circuit unit can be easily replaced with a new unit when it comes time for replacement as a result of the secondary battery becoming superannuated. In this case as well, by providing means for either buffering or preventing an overcurrent reverse current resulting from induced voltage in the DC power circuit, it becomes possible to readily replace the DC power circuit in an energized state. The above-mentioned means is specifically constituted using the reverse current-preventing diode 22 shown in FIG. 1.

The present invention is constituted so that a smoothing capacitor for storing direct voltage in the above-mentioned power circuit is provided, means for either buffering or preventing the above-mentioned overcurrent reverse current constitute a limiting resistor and reverse current-preventing diode connected in parallel, and voltage induced in the primary winding of the above-mentioned high-frequency transformer is stored in the above-mentioned smoothing capacitor via the above-mentioned limiting resistor when the above-mentioned DC power circuit is operating, and the above-mentioned smoothing capacitor backs up the above-mentioned secondary DC outputting circuit when the battery provided in the DC power circuit fails, or this DC power circuit fails.

With a constitution such as that described above, that is, when a limiting resistor and reverse current-preventing diode are placed into a parallel state, when a commercial AC power supply is normal, switching device ON current flows via the primary winding of the high-frequency transformer forward of the above-mentioned reverse current-preventing diode. At this time, if there is only a limiting resistor and no reverse current-preventing diode, the power loss with this limiting resistor is extremely great, and since the system can not be put to practical use, a reverse current-preventing diode is essential. Next, when output from a commercial AC power supply drops below a prescribed value due to a power outage or the like, the DC power circuit transitions to an active state by the input of power from a battery provided in the DC power circuit, and simultaneously with supplying power to a secondary-side load, a voltage, which is induced in the primary winding of the high-frequency transformer, as shown in FIG. 1, returns from one terminal of the primary winding to the other terminal of the primary winding in accordance with a voltage, which becomes positive from the +side of the smoothing capacitor 4, and increases in strength, and a charging current of the smoothing capacitor 4 flows from a fuse 13 to the limiting resistor 12 in the forward direction of a built-in diode 6a of the switching device 6, and current flows. The resistor value of this limiting resistor becomes relatively large in order to limit current so that it does not become an overcurrent from the standpoint of the above-mentioned DC power circuit, but this does not constitute a problem since an arc is not generated when a new power circuit unit is set to a connected state via the connector. Moreover, when the AC output from a commercial AC power supply runs out due to a power outage or the like, and the output to the secondary DC outputting circuit cannot be supplied for some reason, for example, a secondary battery abnormality, or a power outage on the battery side during backup operation by the DC power circuit, in accordance with the above-mentioned power circuit switching device transitioning to an active state, energy charged by the smoothing capacitor can be outputted to the secondary DC outputting circuit via the high-frequency transformer as an input source, and the contents of CPU processing can be evacuated to internal backup memory.

EXPLANATION OF REFERENCE NUMERALS

1 COMMERCIAL AC POWER SUPPLY
2 RECTIFYING CIRCUIT
3 ACTIVE FILTER CIRCUIT
4 SMOOTHING CAPACITOR
5 GATE CIRCUIT
6 FET (SWITCHING DEVICE)
6a BUILT-IN DIODE
7 HIGH-FREQUENCY TRANSFORMER
8 LOAD
9 SECONDARY BATTERY
10 SNUBBER CIRCUIT
11 REVERSE CURRENT-PREVENTING DIODE
12 LIMITING RESISTOR
13 FUSE
14A LOWER PORTION
14B UPPER PORTION
14C CEILING PORTION
15 SECONDARY BATTERY INSERTION SLOT
16 COMMERCIAL AC POWER SUPPLY INSERTION SLOT
17 CHARGING CIRCUIT
18 REVERSE CURRENT-PREVENTING DIODE
19 GATE CIRCUIT
20 FET (SWITCHING DEVICE)
20a BUILT-IN DIODE
21 SNUBBER CIRCUIT
22 REVERSE CURRENT-PREVENTING DIODE
23 FUSE
24 CONNECTOR
25 RECTIFYING DIODE
26 COMMUTATION DIODE
27 SMOOTHING COIL
28 SMOOTHING CAPACITOR
29 FIRST DC OUTPUTTING CIRCUIT
30 PWM SWITCHING CONTROLLER
31 MAGNETIC AMPLIFIER
32 RECTIFYING DIODE
33 COMMUTATION DIODE
34 SMOOTHING COIL
35 SMOOTHING CAPACITOR
36 SECOND DC OUTPUTTING CIRCUIT
50 UNINTERRUPTIBLE POWER SUPPLY
51, 52 SWITCHING POWER SUPPLIES
53, 54 DIODES
A POWER CIRCUIT
B SECONDARY DC OUTPUTTING CIRCUIT
C DC POWER CIRCUIT
K CASING
N1, N2, N3 WINDINGS
D, H, W DIMENSIONS
$T_1$–$T_4$ THICKNESS

DESCRIPTION OF THE PREFERRED EMBODIMENTS

Figure 1:
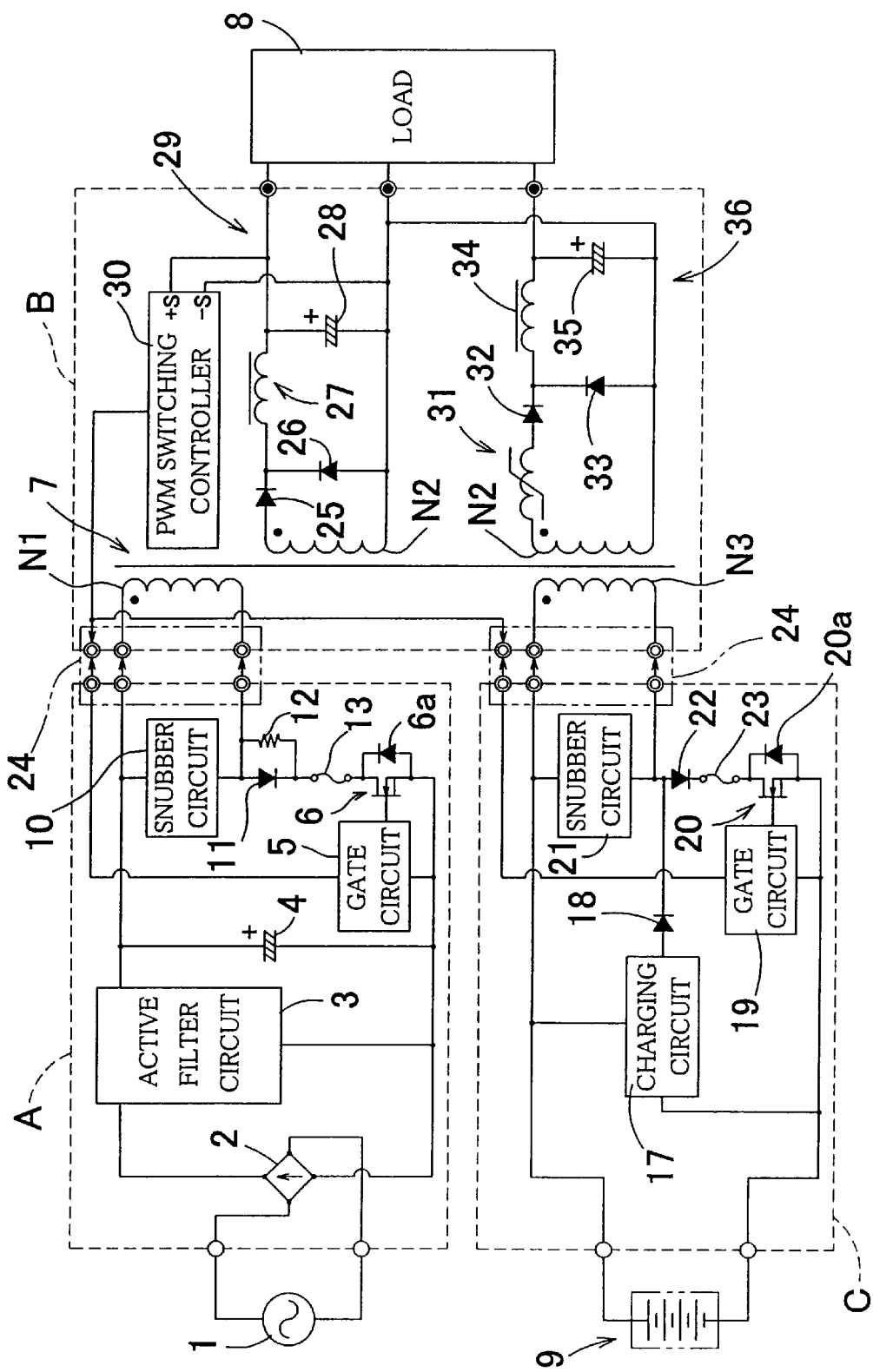
FIG. 1 is an electric circuit diagram of an uninterruptible duplexed power supply system.

FIG. 1 shows a forward-type duplexed power supply system. This duplexed power supply system comprises a power circuit A for rectifying the AC from a commercial AC power supply 1, and outputting the resultant DC to the primary winding Ni of a high-frequency transformer 7; a secondary DC outputting circuit B for connecting to a secondary winding N2 of the above-mentioned high-frequency transformer 7 in an electrically insulated state, and for supplying DC power to a load 8; and a DC power circuit C for supplying power outputted from a secondary battery 9 to the above-mentioned secondary DC outputting circuit B at the tertiary winding N3 of the above-mentioned high-frequency transformer 7in accordance with the state of operation of the above-mentioned power circuit A. Either a fuel cell, a photovoltaic battery, or a nuclear-powered battery can be utilized as the above-mentioned secondary battery 9, and a power generator can be utilized in place of the secondary battery 9. Furthermore, as duplexed power supply systems, in addition to the forward type, there are also the flyback type, the full bridge type, and the half-bridge type, and a duplexed power supply system can be constituted using any of these configurations.

The above-mentioned power circuit A comprises a rectifying circuit 2 for rectifying the AC from the above-mentioned commercial AC power supply 1; an active filter circuit (may be omitted) 3 as a circuit for preventing a higher harmonic current; a smoothing capacitor 4 for storing DC voltage from the above-mentioned active filter circuit 3; an FET 6 as a switching device, which is operated by a gate signal from a gate circuit 5, and which is connected to the primary winding Ni of a high-frequency transformer 7; a snubber circuit (may be omitted) 10 provided for absorbing a surge voltage and linking voltage received by a device; a reverse current-preventing diode 11 as means for preventing an overcurrent reverse current due to an induced voltage from the above-mentioned DC power circuit C to the power circuit A; a limiting resistor (may be omitted) 12; and a fuse (may be omitted) 13 for use as a circuit breaker. Reference numeral 6a shown in the figure is a built-in diode of the FET 6.

Figure 2:
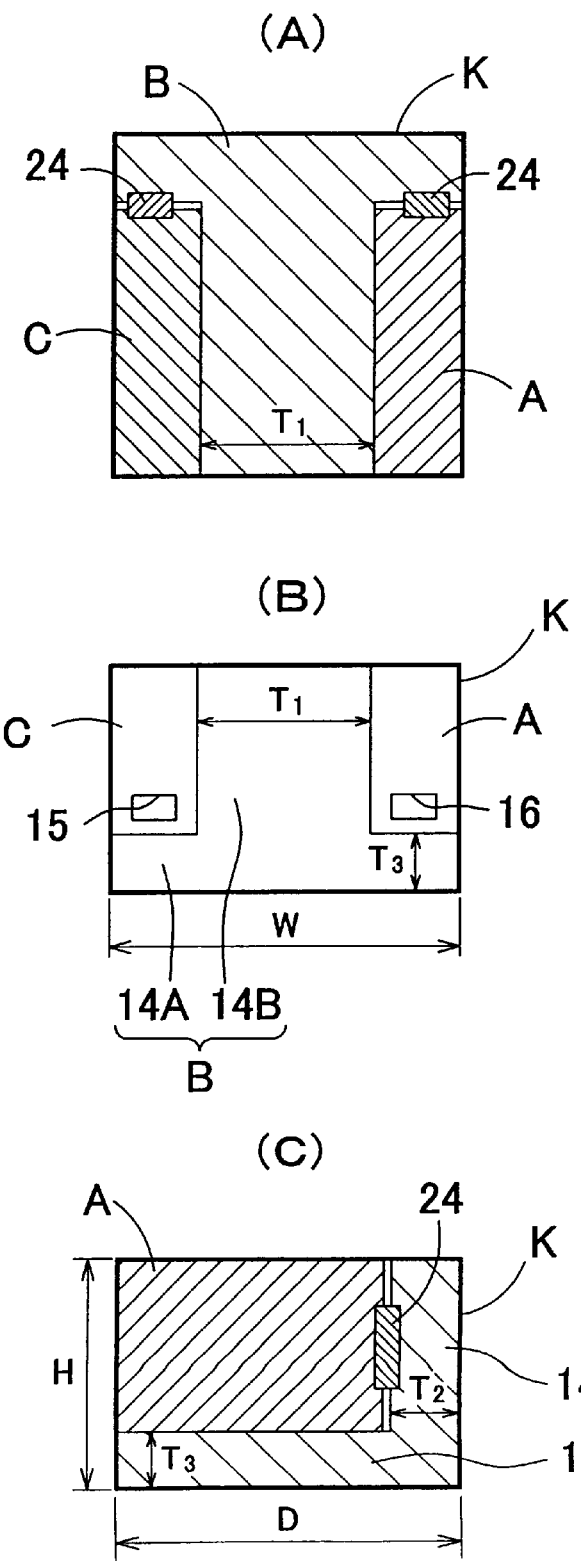
FIGS. 2(A–C) show a simplified constitution of the inside of an uninterruptible duplexed power supply system, with (A) being a horizontal plan view, (B) being a front view, and (C) being a vertical side view.

Then, the present invention is constituted so that the power circuit A of the above-mentioned constitution is unitized, and this power circuit unit A, as shown in FIG. 2 (A), is detachable in a connected state, in which same is electrically connected by a connector 24 to the primary winding Ni of the above-mentioned high-frequency transformer 7, and in a connection release state, wherein this connected state is released. Therefore, when the power circuit unit A fails due to a lightning surge or any of a variety of impulse surges, the power circuit unit A can be replaced quickly and easily by removing the failed power circuit unit A by setting it to the above-mentioned connection release state, and then mounting a new power circuit unit A by using a connector 24 to establish a connected state. When the above-mentioned new power circuit unit A is set in a connected state using the connector 24, because the above-mentioned reverse current-preventing diode 11 can be used to prevent an overcurrent reverse current brought on by an induced voltage in the power circuit A, and a limiting resistor 12 can be used to curb current to the smoothing capacitor 4, it is possible to prevent the generation of an arc and the welding of a contact point in the connector 24, and/or to prevent the electronic components (devices, etc.) that constitute the power circuit A from being damaged, even, for example, when the DC power circuit C is in operation.

In FIG. 2 (A), (B), (C), the above-mentioned secondary DC outputting circuit B, having a rectangular-shaped lower portion 14A inside a casing K that is open only in the front, and comprising an upper portion 14B, which rises up from this lower portion 14A practically in the shape of the letter T in the plan view, is affixed as a common circuit portion, and spaces formed on the upper surface of the lower portion 14A, the upper portion 14B and the casing K on both the right and left sides, respectively, of this secondary DC outputting circuit B are a space to house a power circuit unit A, and a space to house the below-described DC power circuit unit C, and this power circuit unit A and DC power circuit unit C, respectively, are connected to the secondary DC outputting circuit B using the above-mentioned connectors 24, 24. The left-to-right width dimensions W, front-to-back length (depth) dimensions D, and top-to-bottom (height) dimensions H of the above-mentioned casing K can be set as desired. Furthermore, the thickness $T_3$ in the up-down direction of the above-mentioned lower portion 14A, the left-right width dimension $T_1$ of the upper portion 14B, and the thickness $T_2$ in the front-back direction of the back (rear) surface of the upper portion 14B can be set as desired, and the shape of the secondary DC outputting circuit B is not limited to that shown in the figure. Furthermore, reference numeral 15 shown in FIG. 2 (B) is an insertion slot for a secondary battery, into which is inserted a connection cord connector (not shown in the figure) for connecting a DC power circuit C and a secondary battery 9, and reference numeral 16 is an insertion slot for a commercial AC power supply, into which is inserted a connection cord connector (not shown in the figure) for connecting a power circuit unit A to a commercial AC power supply 1. Not shown in the figure, the front opening of the above-mentioned casing K is closed using a plate-shaped cover, in which is formed 2 openings that enable connection cord connectors to be inserted into the above-mentioned secondary battery insertion slot 15, and the commercial AC power supply insertion slot 16.

The above-mentioned limiting resistor 12 is provided for outputting to the secondary DC outputting circuit B output charged during the backup operation of the above-mentioned DC power circuit C by the above-mentioned smoothing capacitor 4 for evacuating to internal backup memory the contents of CPU processing when the AC output from a commercial AC power supply 1 runs out due to a power outage or the like, and the output to the secondary DC outputting circuit B cannot be supplied during backup operation by the above-mentioned DC power circuit C for some reason, such as a secondary battery 9 abnormality, or a power outage on the battery side. The above-mentioned smoothing capacitor 4 has an outputting time of around several tens of milliseconds. Providing the above-mentioned limiting resistor 12 is advantageous in that it makes it possible to solve for the above-mentioned trouble, but the present invention can also be implemented without this limiting resistor 12. Furthermore, providing the above-mentioned limiting resistor 12 allows current to flow as charging current to the smoothing capacitor 4 of a new power circuit unit A when this power circuit unit A is set to a connected state by connector 24, and since this current value is limited, an arc is not generated, thus eliminating problems before they start.

The above-mentioned DC power circuit C comprises a charging circuit 17 for charging the above-mentioned secondary battery 9; a reverse current-preventing diode 18 disposed between this charging circuit 17 and the above-mentioned tertiary winding N3; a FET 20 which functions as a switching device, which is operated by a gate signal from a gate circuit 19, and which is connected to the tertiary winding N3 of a high-frequency transformer 7; a snubber circuit 21, which is provided for absorbing surge voltage and linking voltage received by a device; a reverse current-preventing diode 22 as means for preventing an overcurrent reverse current resulting from an induced voltage in the DC power circuit C from the above-mentioned power circuit A; and a fuse 23 for circuit breaking. Reference numeral 20a shown in the figure is an internal diode of the FET 20.

Then, the present invention is constituted so that the DC power circuit C of the above-mentioned constitution is unitized, m and this DC power circuit unit C, as shown in FIG. 2 (A), is detachable in a connected state, in which same is electrically connected by a connector 24 to the tertiary winding N3 of the above-mentioned high-frequency transformer 7, and in a connection release state, wherein this connected state is released. Therefore, when the DC power circuit unit C fails for some reason, the DC power circuit unit C can be replaced quickly and easily by removing the failed DC power circuit unit C by setting it to the above-mentioned connection release state, and then mounting a new DC power circuit unit C by using a connector 24 to establish a connected state. When the above-mentioned new DC power circuit unit C is set in a connected state by the connector 24, because the above-mentioned reverse current-preventing diode 22 can be used to prevent an overcurrent reverse current caused by voltage induced in the DC power circuit C, it is possible to prevent the generation of an arc and the welding of a contact point in the connector 24, and/or to prevent the electronic components (devices, etc.) that constitute the DC power circuit C from being damaged, even, for example, when the power circuit A is in operation.

The above-mentioned secondary DC outputting circuit B comprises a first DC outputting circuit 29, which supplies a prescribed DC output power to a load 8. This first DC outputting circuit 29 comprises a rectifying diode 25, a commutation diode 26, a smoothing coil 27, and a smoothing capacitor 28, which are connected to a secondary winding N2 of a high-frequency M transformer 7, and has connected on the load 8 side to a PWM switching controller 30 for controlling a constant voltage to this load 8. The above-mentioned secondary DC outputting circuit B also comprises a second DC outputting circuit 36, which is capable of supplying a DC output power of a different value than that of the above-mentioned DC output power. This second DC outputting circuit 36 comprises a magnetic amplifier 31, a rectifying diode 32, a commutation diode 33, a smoothing coil 34, and a smoothing capacitor 35, which are connected to a secondary winding N2 of the above-mentioned high-frequency transformer 7. Furthermore, third, fourth and other outputs can also be added in accordance with the application. Therefore, the present invention is constituted so as to enable DC output power to be changed in accordance with the capacity of a load 8. And then, the present invention is constituted so as to enable constant voltage control to a load 8 via either the first DC outputting circuit 29 or the second DC outputting circuit 36 by using the PWM switching controller 30 to control the pulse widths of gate signals outputted from the above-mentioned gate circuits 5, 19. The above-mentioned second DC outputting circuit 36 can be omitted, or a third DC outputting circuit can be installed in addition to the second DC outputting circuit 36.

The present invention can be constituted so that control signals are constantly outputted from the above-mentioned PWM switching controller 30 to the 2 gate circuits 5, 19, and so the 2 switching devices 6, 20 are synchronized. Furthermore, when the commercial AC power supply 1 is operating normally, the switching device 6 of power circuit A is set to the active state, and the switching device 20 of DC power circuit C is synchronized with the above-mentioned switching device 6, and set to either idle or the OFF state. When there is an abnormality, wherein the voltage from the commercial AC power supply 1 drops below a prescribed voltage, contrary to the above, the switching device 6 of power circuit A is synchronized with the above-mentioned switching device 20, and set to either idle or the OFF state, and the switching device 20 of DC power circuit C is set to the active state.

Figure 3:
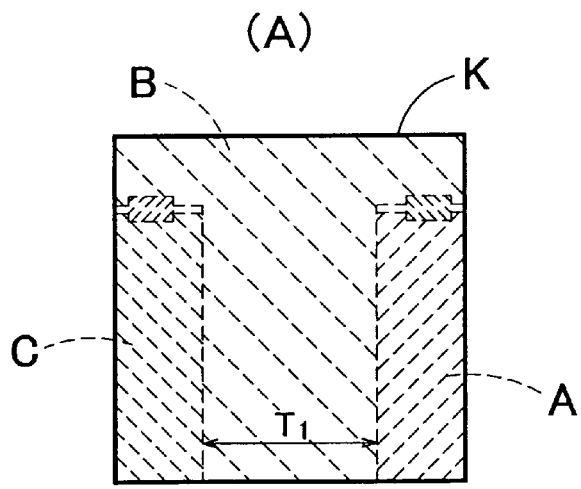
FIGS. 3(A–C) shows another simplified constitution of the inside of an uninterruptible duplexed power supply system, with (A) being a horizontal plan view, (B) being a front view, and (C) being a vertical side view.
Figure 3:
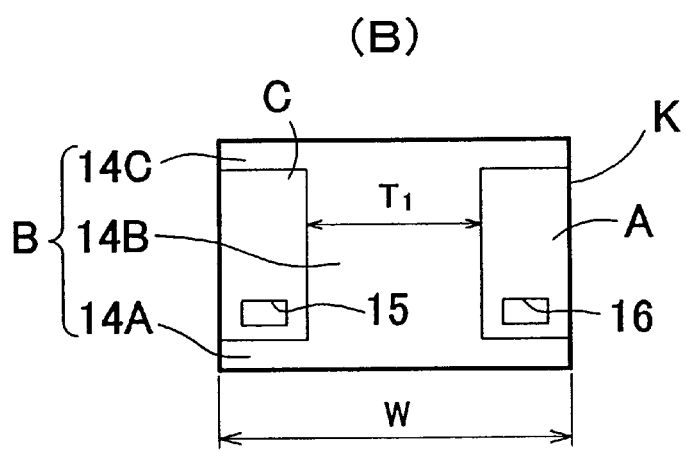
Figure 3:
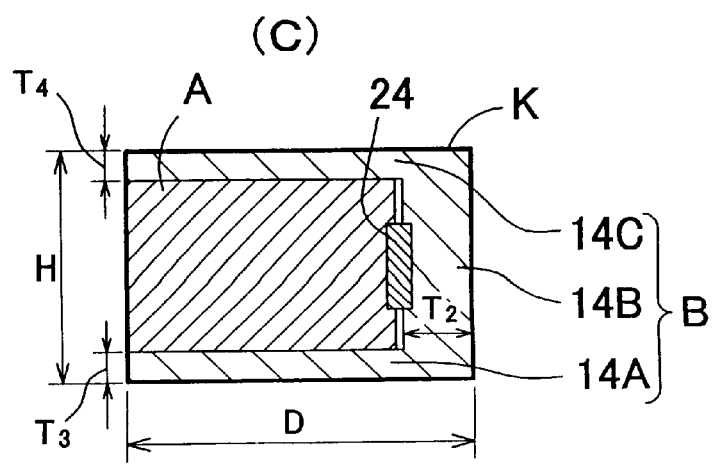
Figure 4:
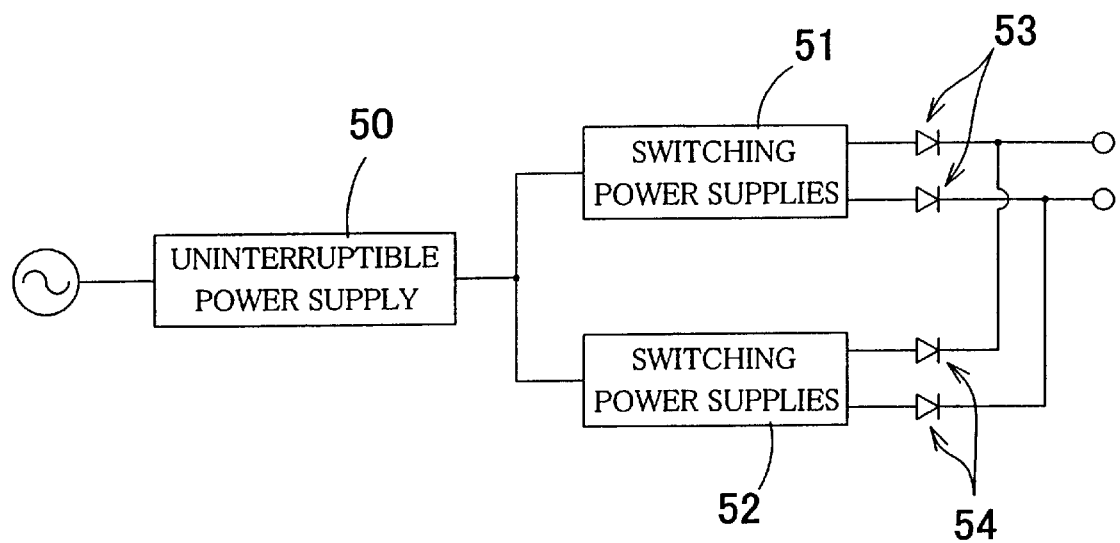
FIG. 4 is a block diagram showing the specific constitution a conventional uninterruptible duplexed power supply system.

The shape of the above-mentioned secondary DC outputting circuit B can be constituted as shown in FIG. 3 (A), (B), (C). In other words, the secondary DC outputting circuit B is practically in the shape of the letter I when viewed from the front, comprising a rectangular-shaped lower portion 14A inside a casing K that is open only at the front, and an upper portion 14B, which rises upward from the center portion in the left-right direction of this lower portion 14A, and a ceiling portion 14C, which extends from the top end of the upper portion 14B. Then, the secondary DC outputting circuit B is constituted so as to insert the above-mentioned power circuit unit A and DC power circuit unit C into the spaces formed on both sides of this secondary DC outputting circuit B. In this case as well, the left-to-right width dimensions W, front-to-back length (depth) dimensions D, and top-to-bottom (height) dimensions H of the casing K can be set as desired. Furthermore, the thickness $T_3$ in the up-down direction of the above-mentioned lower portion 14A, the left-right width dimension $T_1$ of the upper portion 14B, the thickness $T_2$ in the front-back direction of the back (rear) surface portion of the upper portion 14B, and the thickness $T_4$ in the up-down direction of the ceiling portion 14C can be set as desired, and the shape of the secondary DC outputting circuit B is not limited to that shown in the figure. Furthermore, because another constitution that was not explained is the same as that in FIG. 2 (A), (B), (C), this description will be omitted.

According to the present invention, it is possible to provide an uninterruptible duplexed power supply system, which, while enabling the realization of both a compact (space saving) size and high efficiency by connecting in parallel relative to a load a power circuit and a DC power circuit via a high-frequency transformer, is not only a highly reliable system, which is capable of driving a load continuously without stopping by instantaneously supplying power from a DC power circuit should the power circuit fail due to a lightning surge or any of various impulse surges, but also enhances reliability further by enabling a power circuit failure to be solved quickly and easily by simply replacing a unitized failed power circuit unit with a new power circuit unit while a load is in the drive state. Moreover, because the constitution enables the unit as a whole to be replaced, even an unskilled individual with little knowledge of electricity can replace a power circuit unit, provided there is a new one on hand, enabling failures to be handled quickly.

It is also possible to provide a useful uninterruptible duplexed power supply system, which not only enables simplification of the control of a power circuit and a DC power circuit, but also makes it possible to enhance the durability of switching devices, and to reduce running costs, by using a constitution, which drives a load by operating only a power circuit when a commercial AC power supply is operating normally, and drives a load by operating only a DC power circuit when there is an abnormality, which causes the commercial AC power supply to drop below a prescribed value.

In the present invention, it is possible to provide an uninterruptible duplexed power supply system, which, in accordance with also unitizing the DC power circuit, enables the DC power circuit unit to be readily replaced with a new unit when it comes time for replacement as a result of the secondary battery becoming superannuated.

It is also possible to provide an uninterruptible duplexed power supply system, which is more useful from the aspect of safety in that it is even capable of dealing with trouble that occurs in the DC power circuit, because, in accordance with being constituted so that a smoothing capacitor for storing DC voltage in the power circuit is provided, means for buffering or preventing overcurrent reverse current constitute a limiting resistor and a reverse current-preventing diode connected in parallel, voltage induced in the primary winding of a high-frequency transformer when a DC power circuit is operating is stored in the smoothing capacitor via the above-mentioned limiting resistor, and the smoothing capacitor backs up the secondary DC outputting circuit when a battery provided in the DC power circuit fails, or the DC power circuit fails, it is possible to evacuate the contents of CPU processing to internal backup memory by outputting static energy charged and stored in the smoothing capacitor to the secondary DC outputting circuit via the limiting resistor even when the AC output from a commercial AC power supply runs out due to a power outage or the like, and the output to the secondary DC outputting circuit cannot be supplied during backup operation by the DC power circuit for some reason, for example, a secondary battery abnormality, or a power outage on the battery side.

What is claimed is:

1. An uninterruptible duplexed power supply system, which is constituted by connecting to the primary winding of a high-frequency transformer a AC power circuit comprising a rectifying circuit, which rectifies the AC from a commercial AC power supply, and a first switching device provided on the output side of this rectifying circuit; and connecting to a secondary winding of said high-frequency transformer a secondary DC outputting circuit, which supplies electric power to a load; and connecting to a tertiary winding of said high-frequency transformer a DC power circuit, comprising a second switching device for either synchronizing with said AC power circuit, or for operating said DC power circuit in accordance with the operating status of the AC power circuit, this uninterruptible duplexed power supply system being constituted so that at least the AC power circuit is unitized, and the AC power circuit is detachable in a connected state, in which the AC power circuit is electrically connected to the primary winding of said high-frequency transformer, and in a connection release state, wherein this connected state is released; and in constituted so as to provide means for either buffering or preventing an overcurrent reverse current resulting from induced voltage from said DC power circuit via said high-frequency transformer to said power circuit, and so that said power circuit unit is detachable in an energized state.

2. The uninterruptible duplexed power supply system according to claim 1, wherein during normal operation of said commercial AC power supply, the first switching device of said AC power circuit is in the active state, this AC power circuit operates, and the second switching device of said DC power circuit is either idle, or in the OFF state, and this DC power circuit is maintained in the idle state; and when there is an abnormality, in which said commercial AC power supply drops below a prescribed value, the first switching device of said AC power circuit becomes either idle or enters the OFF state, and the second switching device of said DC power circuit transitions to the active state, this DC power circuit operates and an uninterruptible power supply is furnished to said load.

3. The uninterruptible duplexed power supply system according to claim 1, which is constituted so that said DC power circuit is unitized, and this DC power circuit unit is detachable in a connected state, in which same is electrically connected to the tertiary winding of said high-frequency transformer, and in a connection release state, wherein this connected state is released; and is constituted so as to provide means for either buffering or preventing an overcurrent reverse current resulting from induced voltage from said AC power circuit via said high-frequency transformer to said DC power circuit, and so that said DC power circuit unit is detachable in an energized state.

4. The uninterruptible duplexed power supply system according to claim 1, which is constituted so that a smoothing capacitor for storing DC voltage in said DC power circuit is provided; means for buffering or preventing said overcurrent reverse current constitute a limiting resistor and a reverse current-preventing diode connected in parallel; voltage induced in the primary winding of said high-frequency transformer when said DC power circuit is operating is stored in said smoothing capacitor via said limiting resistor; and said smoothing capacitor backs up said secondary DC outputting circuit when a battery provided in this DC power circuit fails, or this DC power circuit fails.

* * * * *